United States Patent
Allen

[15] 3,646,957
[45] Mar. 7, 1972

[54] HIGH-PRESSURE RELIEF BELLEVILLE VALVE

[72] Inventor: Thomas E. Allen, East Peoria, Ill.
[73] Assignee: Caterpillar Tractor Co., Peoria, Ill.
[22] Filed: Apr. 22, 1970
[21] Appl. No.: 30,679

[52] U.S. Cl...........................................137/525
[51] Int. Cl..............................................F16k 15/14
[58] Field of Search..........................137/516, 525

[56] References Cited

UNITED STATES PATENTS

| | | | |
|---|---|---|---|
| 3,179,122 | 4/1965 | Wasdell | 137/525 X |
| 3,363,729 | 1/1968 | Rumsey | 137/525 X |
| 2,585,863 | 2/1952 | Smith | 137/525 |
| 2,676,614 | 4/1954 | Strauss et al. | 137/516 |

FOREIGN PATENTS OR APPLICATIONS 1,244,909  9/1960  France.................................137/525

Primary Examiner—Robert G. Nilson
Attorney—Fryer, Tjensvold, Feix, Phillips & Lempio

[57] ABSTRACT

A high-pressure relief valve is constructed of a Belleville-type spring washer preloaded in a housing to serve as a resilient barrier to fluid flow between inlet and outlet openings in the housing. Means are provided for reducing the pressure effect of the fluid on the washer to thereby increase the pressure required to actuate the valve. This is accomplished by reducing the area of effective pressure on the face of the washer.

7 Claims, 5 Drawing Figures

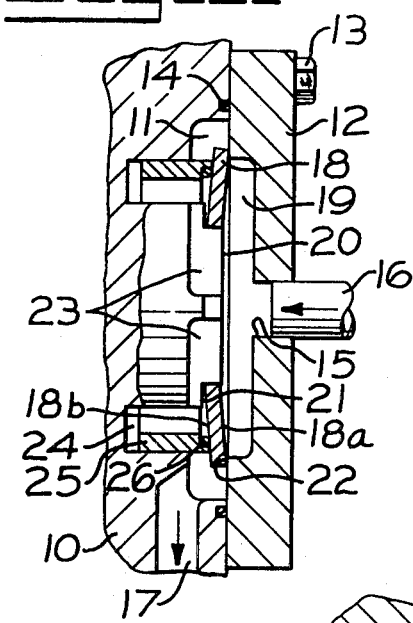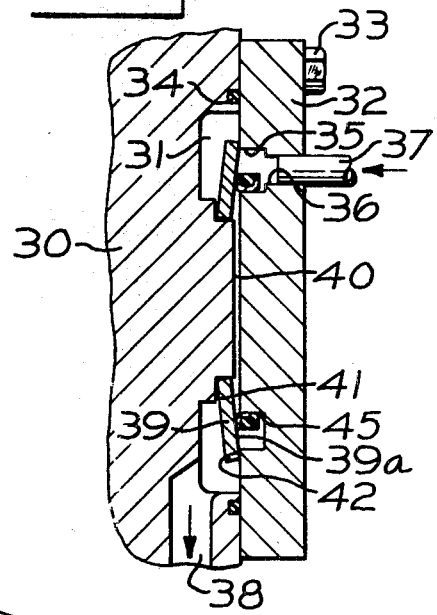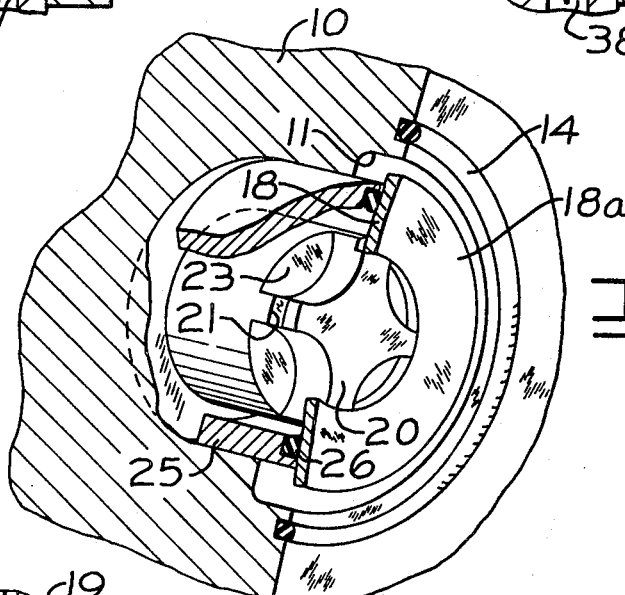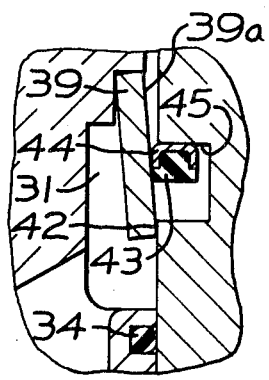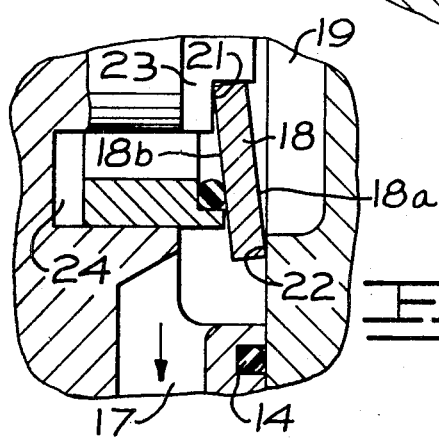
INVENTOR
THOMAS E. ALLEN

HIGH-PRESSURE RELIEF BELLEVILLE VALVE

BACKGROUND OF THE INVENTION

The present invention relates to high pressure relief valves and pertains more particularly to Belleville-type relief valves.

High-pressure fluid-handling systems generally employ pressure relief valves to limit pressures in certain portions of the system. Conventionally such systems employ spool valves or poppet valves.

Spool valves employ a spring-biased spool which moves in response to predetermined pressure to dump fluid generally back to the sump. Spool valves have the disadvantage of being expensive and subject to jamming or sticking because of the extremely close tolerances required. Also, because of their size, they consume valuable space and tend to have large inertia which causes slow response, overshooting, and "hunting."

Poppet valves, on the other hand, tend to have a restricted flow volume. Spring washer type relief valves have been restricted to operating pressures of less than 1,000 pounds per square inch due to high valve member stresses and high preload forces.

SUMMARY OF THE INVENTION

The primary object of the present invention is to provide a low-cost reliable relief valve that is suitable for high-pressure applications.

Another object of the present invention is to provide a compact relief valve that is reliable in operation and is capable of high flow rates.

In accordance with the present invention, a housing is provided with a preloaded Belleville washer serving as a resilient barrier between a high-pressure inlet opening and an outlet opening in the housing. The washer is responsive to a predetermined fluid pressure to permit said fluid to flow past the outer periphery thereof to the outlet opening. Means are provided to limit the effective fluid pressure on the washer.

BRIEF DESCRIPTION OF THE DRAWINGS

FIG. 1 is a sectional view of a preferred embodiment of the present invention;

FIG. 2 is an isometric view in section of the outlet housing and control elements of the embodiment of FIG. 1;

FIG. 3 is a fragmentary view showing details of FIG. 1;

FIG. 4 is a sectional view of an alternate embodiment of the present invention;

FIG. 5 is a fragmentary view showing details of FIG. 4.

DETAILED DESCRIPTION OF THE DRAWINGS

Referring now to the drawings and more particularly to FIG. 1, there is illustrated a pressure relief valve incorporating the preferred embodiment of the present invention. The pressure relief valve comprises housing 10 having an annular chamber 11 formed therein and enclosed by means of a cover 12 held in place such as by means of capscrews 13. The cover 12 is preferably sealed to the housing 10 by means of a seal 14. An inlet opening 15 communicates by means of a conduit 16 with a source of pressurized fluid (not shown) and an outlet opening 17 communicates with a sump or other circuit (not shown). A Belleville-type spring washer 18 is positioned within the housing to function as a valve element and to form a resilient barrier between the inlet opening 15 and the outlet opening 17. This serves as a barrier to pressurized fluid to prevent the passage of fluid from chamber 19 in cover 12 at the concave side of the washer from escaping past the outer diameter thereof into chamber 11 where it then passes out outlet 17. The washer 18 is supported by support means 20 and preloaded between shoulders 21 thereon acting as a fulcrum and outer rim 22 of cover 12 forming a valve seat. The preload of spring 18 is overcome by means of force acting on its face or concave side 18a which is normally a function of the pressure times the area. However, in order to effectively increase the pressure responsiveness, means are provided to reduce the pressure effect on said concave side of the washer.

This pressure effect reducing means in the present embodiment comprises means for transferring or communicating the pressurized fluid from the inlet opening and placing it in contact with a portion of the convex side 18b of the spring washer 18. This pressure effect reducing means comprises a plurality of passageways 23 for communicating fluid from chamber 19 into an annular chamber 24 formed in housing 10. An annular ring or sleeve 25 is slidably mounted in annular chamber 24 and carries a ring seal 26 which is in tight engagement with the convex side 18b of the washer 18. This arrangement effectively permits pressurized fluid to act on the convex side 18b of the spring washer 18 to offset a portion of the pressure acting on the concave side 18a thereof. Thus the effective pressure, that is, the pressure which is effective to actuate the valve member 18, is the pressure that acts on the area of face 18a which is in excess of the area or fluid contact area on face 18b. This effect can be more easily visualized in FIG. 3 where it is seen that the outer diameter of the fluid contact of face 18a is somewhat greater than the outer diameter of the fluid contact of 18b. Thus, instead of attempting to increase the stiffness of the spring washer, the force applied to the washer for a given fluid pressure is reduced. This enables one to keep the stiffness and thickness of the washer to a minimum so that it can be more easily controlled.

One could alter the construction of FIG. 1 by fixing sleeve 25 to the housing 10 or providing a similar annular abutment, integral with the housing, such that the valve member pivots about the abutment rather than support member shoulder 21. Although this construction offers manufacturing advantages, flow rate capacity is somewhat reduced.

Referring now to FIGS. 4 and 5, there is illustrated an alternate embodiment of the present invention. In this embodiment, the pressure relief valve assembly comprises a housing 30 having an annular chamber 31 formed therein and enclosed by a cover 32 held in place such as by capscrews 33. A seal 34 is provided for sealing the chamber. The cover 32 has an annular chamber 35 formed therein and an inlet opening 36 communicating therewith such as by means of a conduit 37 from a source of pressurized fluid (not shown). An outlet opening 38 formed in housing 30 provides communication between annular chamber 31 and a sump or other fluid circuit (not shown). A Belleville-type spring washer 39 is carried on support means 40 and preloaded between shoulder or fulcrum 41 and an annular valve seat comprising rim or surface 42 of cover 32. The spring washer 39 provides a resilient barrier between the inlet opening 36 and chamber 35 and the chamber 31 and outlet opening 38, for fluid contained in chamber 35 under a predetermined pressure.

Means are provided for reducing the effective pressure on the concave side 39a of the spring 39. This pressure effect reducing means comprises an annular sleeve comprising seal 43 having a backing ring 44 and mounted on cylindrical surface 45. The seal member 43 slides along face 45 and engages face 39a on the concave side of spring member 39. This in effect reduces the effective force on spring member 39 by reducing the contact area of pressurized fluid along face 39a. Thus, as can be seen more readily in FIG. 5, the pressurized fluid acting on face 38a of washer member 39 is confined to an area within an annular chamber 35 between seal member 43 and the annular shoulder 42. Thus, as can be seen, because of the small area contact of pressurized fluid, the responsiveness of spring or washer member 39 is altered such that a very high fluid pressure is needed to actuate the valve member.

Thus from the above disclosure it can be seen that I have disclosed a high pressure relief valve comprising a housing forming a chamber with a Belleville-type washer contained therein, forming a resilient barrier between inlet opening and an outlet opening for pressurized fluid below a predetermined level, with means to reduce the pressure effect on the concave side of the washer.

What is claimed is:

1. A high pressure relief valve, said valve comprising:
   housing means forming a chamber;
   an inlet opening formed in said housing for communicating said chamber with a source of pressurized fluid;

an outlet opening formed in said housing and communicating with said chamber;

a Belleville-type spring washer having convex and concave faces forming a barrier in said housing between said openings;

said washer being preloaded and thereby responsive to a predetermined fluid pressure on the concave side thereof to spring back and permit a flow of fluid around the outer diameter thereof;

pressure effect reducing means comprising a sleeve member slidably mounted in said housing in annular engagement with said washer; and, means for directing said fluid pressure into contact with a portion of the convex side of said washer to thereby offset the effect of a portion of said fluid in engagement with the concave side thereof.

2. A high pressure relief valve, said valve comprising:

a housing having a chamber formed therein;

inlet and outlet openings communicating with said chamber;

an annular valve seat disposed in said chamber;

support means to form a fulcrum disposed opposite said valve seat in said housing;

an annular resilient washer having inner and outer diameters and oppositely directed faces mounted between said support means and valve seat;

said washer being supported at one of said diameters by said support means and engaging said valve seat adjacent the other of said diameters to function as a pressure responsive valve element to control flow of fluid between said inlet and outlet openings;

said washer being responsive to fluid pressure acting on one of said faces to pivot said washer away from said valve seat to permit fluid to flow thereby; and, an annular sleeve slidably mounted in said housing and sealingly engaging said washer between said valve seat and said fulcrum to reduce the area of effective pressure for actuating said valve.

3. The invention of claim 2 wherein said washer is a Belleville-type having convex and concave faces.

4. The invention of claim 3 wherein said sleeve engages said convex face to direct pressurized fluid to a portion thereof.

5. The invention of claim 3 wherein said sleeve engages said concave face to reduce the area of fluid contact therewith.

6. The invention of claim 3 wherein said washer is supported at the inner diameter and said outer diameter engages said annular seat.

7. The invention of claim 6 wherein said sleeve engages the convex face of said washer; and, means to direct pressurized fluid to a portion of said convex face.

* * * * *